E. NALL.
METHOD OF MAKING TIRES.
APPLICATION FILED JUNE 21, 1916.
1,316,104.
Patented Sept. 16, 1919.
3 SHEETS—SHEET 1.
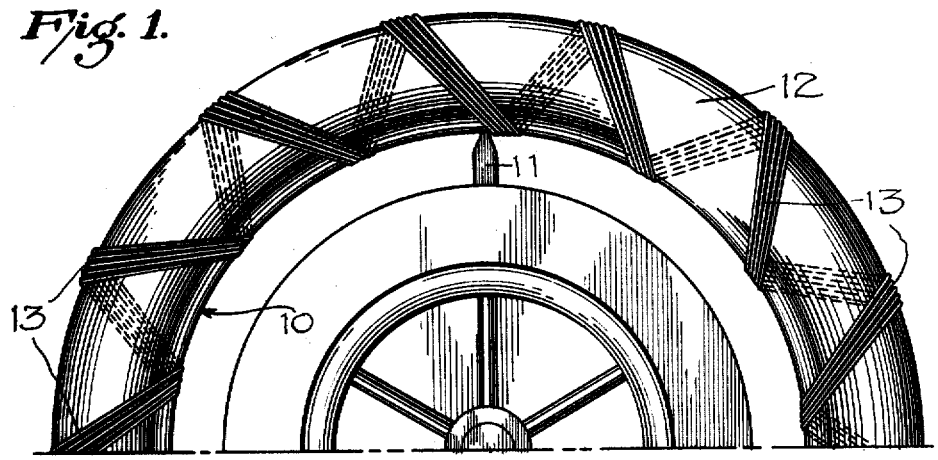
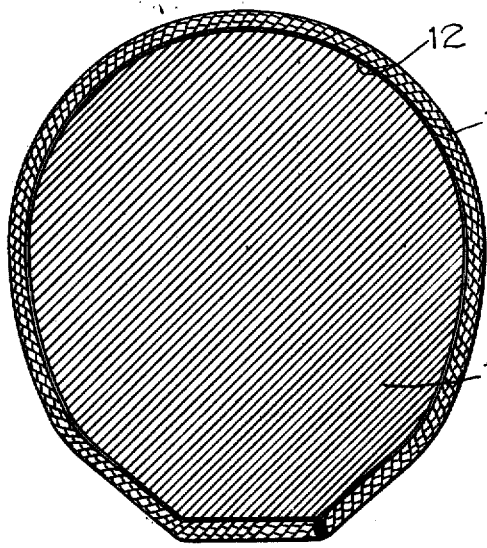 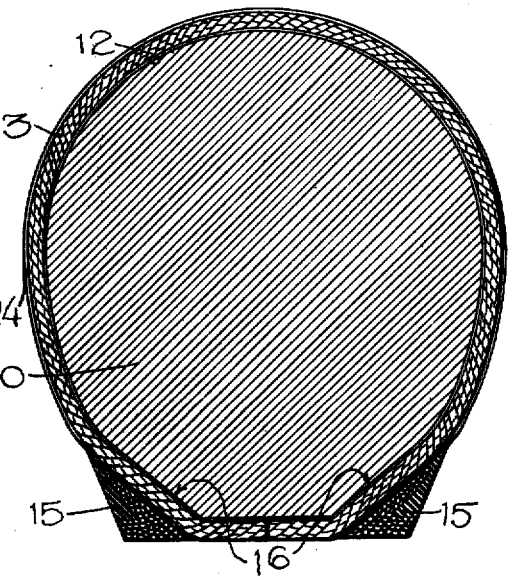
Inventor
Edward Nall.
Witness
C. V. P. Newbold
By C. L. Landon
Attorney

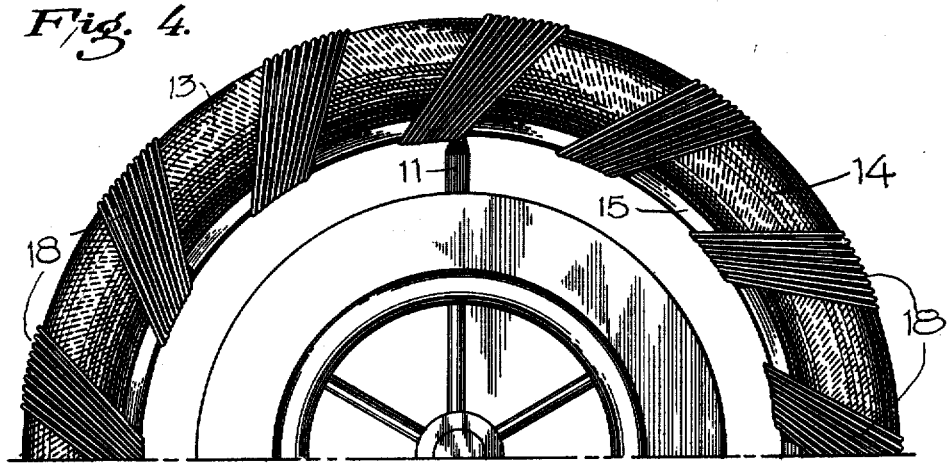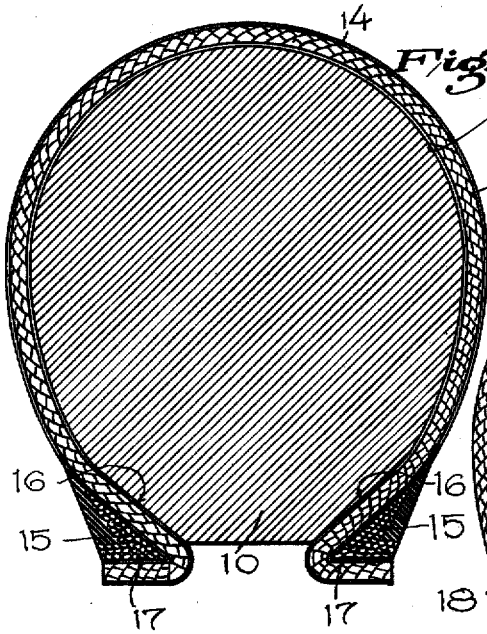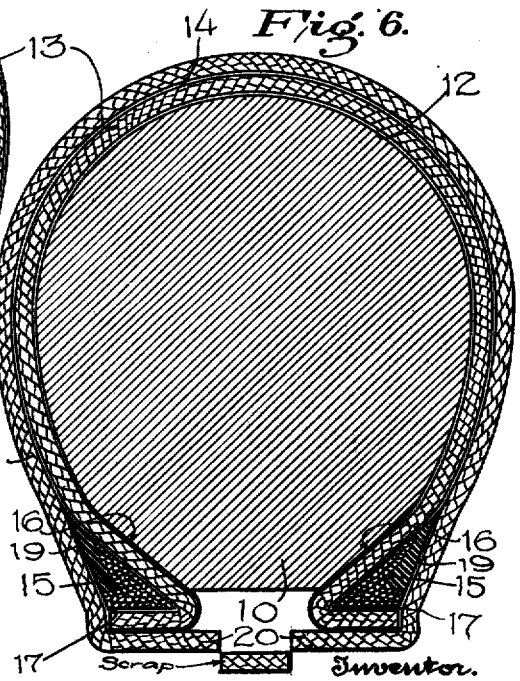

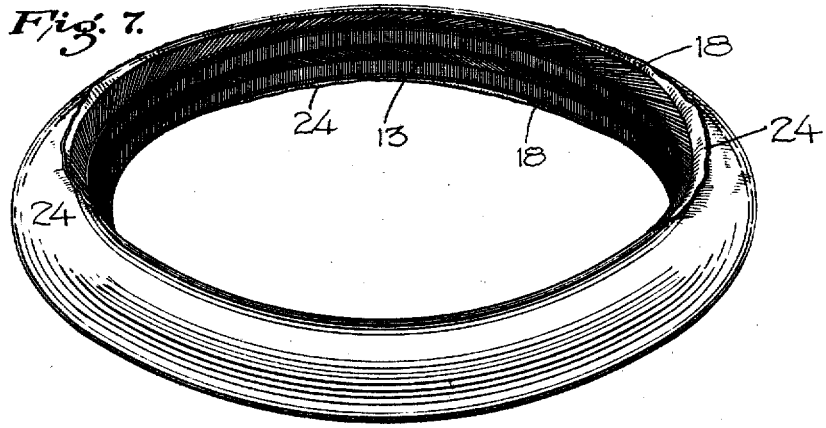
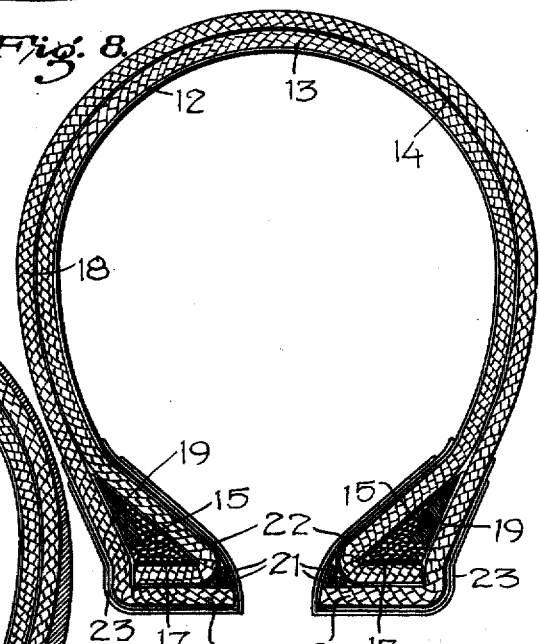
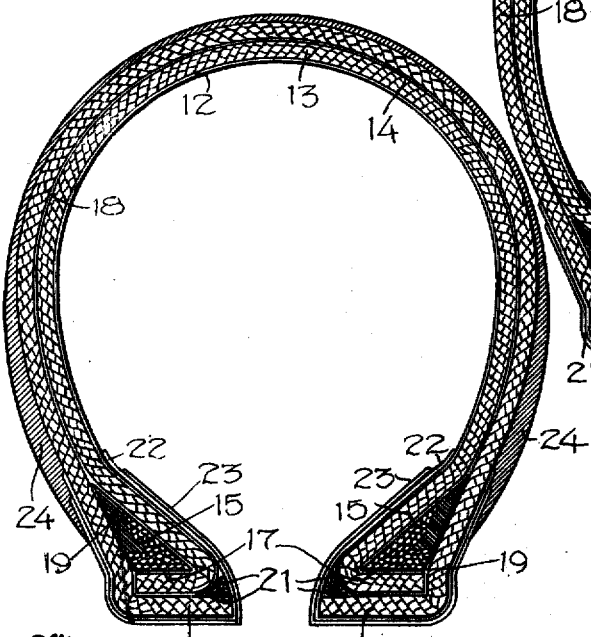

UNITED STATES PATENT OFFICE.

EDWARD NALL, OF AKRON, OHIO, ASSIGNOR TO THE GOODYEAR TIRE AND RUBBER COMPANY, OF AKRON, OHIO, A CORPORATION OF OHIO.

METHOD OF MAKING TIRES.

1,316,104.    Specification of Letters Patent.    Patented Sept. 16, 1919.

Application filed June 21, 1916. Serial No. 104,956.

*To all whom it may concern:*

Be it known that I, EDWARD NALL, a citizen of the United States, residing at Akron, in the county of Summit and State of Ohio, have invented new and useful Improvements in Methods of Making Tires.

My present invention relates to improvements in the manufacture of pneumatic tire casings and more particularly relates to a method for building up a "cord" carcass of a pneumatic casing.

As a principal object it is contemplated by the present invention to provide a method whereby the cord may be laid up directly upon a ring core, the laying up process being refined to such simplicity, that while the opposite bias relation between cords comprising adjacent layers is readily obtained it is not necessary to follow either of the more complicated present day practices, which respectively comprise the building of the cords of each layer into a loose temporary fabric prior to their application to the core, and the employment of winding pins or hooks determining the course of the cord in its application to the core.

Another important object of my invention is the provision of a method of this general character, one of the steps of which consists in the binding of a bead into the casing by cord ends which define the edges of adjacent cord layers, such edges being lapped to inclose the bead by making similar bias angles with the respective plies or layers which they laterally terminate.

A still further object of the invention is to provide a novel or efficient method and means by which the sheared ends of the cords may be securely attached to the bead, such means consisting in part in a semi-hard rubber union between the several cord ends and the bead.

The above and additional objects of a similar nature, which will be hereinafter more specifically treated, are preferably accomplished by such means as are illustrated in the accompanying drawings, described in the following specification, and then more particularly pointed out in the claims which are appended hereto and form a part of this application.

With reference to the drawings, wherein there has been illustrated a preferred embodiment of the invention as it is reduced to practice, and throughout the several views of which, similar reference numbers designate corresponding parts:

Figure 1 is a half elevational view showing the method of winding the first cord layer upon the core;

Fig. 2 is a transverse sectional view taken through the core showing the first layer wound thereon;

Fig. 3 is a view similar to Fig. 2 showing the application of the beads to the carcass;

Fig. 4 is a view similar to Fig. 1 showing the application of the second cord layer to the core;

Figs. 5 and 6 are respective cross-sectional views taken through the core of Fig. 4 showing the bending of the cords of the first layer about the beads and the wrapping of the cords of the second layer also thereabout.

Fig. 7 is a view in perspective of the completed carcass removed from its core, parts of the outer gum envelop being rolled back to disclose the cord formations; and Figs. 8 and 9 are transverse sectional views taken through the carcass showing, respectively, the manner of applying the chafing strips and of building out the side walls of the tire.

It should be here noted that the cross-sectional views of the drawings show, for the sake of clearness, the application of but a single cord in each layer to the core, or the presence of but a single cord pass or convolution in each layer of the carcass.

In the attainment of the objects of this invention, my novel process includes the following steps: (*a*) the application of a sheet of uncured or green gum to the core; (*b*) the helical winding of a continuous cord about a ring core to produce a cord cover entirely inclosing the core, the cord passes or convolutions of the cover making annular bias angles with the core surface; (*c*) the application of a sheet of uncured gum to this first layer of cords; (*d*) the application of endless beads upon opposite sides of the cord layer in proximity to the belly thereof; (*e*) the application of an uncured strip of gum to the bare face of each bead; (*f*) the slitting of the produced cord cover centrally along its belly and the bending outward of the opposite edges of the cord layer to lap respective beads in such a manner that the cords composing the lapped edges extend at an angle to the angle of their application to the core; (g) the application of an uncured gum strip to the outside face of each bead; (h) the winding of a second cord layer upon the core and at a bias angle opposite to the bias angle of application of the cords of the first layer; (i) the slitting of the second cord layer along its belly and then turning in of the separate edges thus produced to reversely overlap respective beads; (j) the building out of the toe flanges of the carcass along the lapped edges of the cord layer and the application of binding strips thereto to maintain each of the turned edges of the layers in their clamping juxtaposition to the bead; and (k) the building out of the tire side walls to complete the method of laying up the cord carcass in readiness for the treading operation and for its vulcanization. The various steps in my novel carcass building method will be described in detail in the order of their performance.

In the drawings a collapsible core 10 is provided for the laying up operation comprehended by this invention. This core is preferably of the usual solid or hollow type and is supported upon the adjustable spokes 11 of a spider also of such a common type as not to require a complete illustration. The core 10 is coated with cement at the initiation of my method and is completely covered with thin strips of pure rubber gum which form an inclosing sheet or apron 12 therefor, in which the first cord layer is to be embedded.

A continuous length of the cord used for both layers is composed of separate threads coated with a solution of which rubber is preferably the basis and helically twisted to form the cord unit, the exterior of which is sufficiently "tacky" to insure firm adhesion to the core apron 12. The first cord layer 13 is applied to the core 10 by a helical wrapping completely around the exterior of the core, and the winding process may be accompanied by the application of a desired degree of tension to the cord in order that the convolutions of the entire layer may be uniformly stretched into place. The pitch of the helix is such that the cord convolutions make a constant bias angle of 45 degrees with the core surface which they overlie.

The first layer of cords being thus completed, a number of strips 14 (or a single sheet) of uncured gum, are applied to the cords to form an inclosing blanket therefor.

Endless beads 15 herein shown as of the non-extensible type, are next applied in the manner illustrated in Fig. 3 and with sufficient pressure to insure the adhesion of each cord end to the bead through the gum 14 whereby the tension on the cords will be maintained. The beads are usually triangular in cross-section and have the surface forming the hypotenuse of the triangular cross-section pressed firmly into contact with the portions of the cord cover immediately adjacent the belly of the carcass. As illustrated in all of the sectional views the core 10 may be formed with annular beveled surfaces 16 adjacent its inner circumference for accommodation of these beads in their proper position.

When both beads have been applied, a cutting instrument is pressed against the inner diameter of the core and the latter rotated upon its spider in order that the inclosing cover provided by the layer 13 may be annularly slit along its belly. The severed extremities of the cord are not displaced by this slitting operation owing to the fact of their being securely embedded in the rubber coating 12.

The edges of the cord layer protruding beyond respective beads are then turned back upon themselves and outwardly into the lapped position with respect to the bases of the beads 15 shown in Fig. 5, this turning process twisting the severed cord extremities out of their bias angle with respect to the core 10 in the manner illustrated in Fig. 7. Previous to or after their adjustment upon the layer 13, the base faces of the beads 15 may be provided with a coating of uncured gum 17 adapted to maintain the cord ends in the position illustrated.

Fig. 6 shows the carcass in its next step of construction, which is completed when the cord comprising the second layer 18 has been applied to helically encircle the core 10, but at a bias angle of 45 degrees directly opposite the bias angle of the cord comprising layer 13. The cords of the two superposed layers accordingly cross each other at right angles. The second layer is also slit along its belly and the severed cord extremities complete the inclosure of the beads 15 upon their outer faces and also serve to lap both the bead bases and the bent extremities of the first cord layer lapping such bases. Before the laying up of this second cord layer onto the carcass, sheets of gum 19 are placed upon the side faces of the beads and extended across the lapped ends of the cord layer 14 to form a continuation of the gum coat 14. The slitting process includes two belly cuts for the layer 18 and the removal of a central annular scrap portion between the beads.

It will be seen upon reference to Fig. 6 that the lapped edges 20 of the second cord layer 18 project beyond the beads in order to complete the delineation of the toe flanges of the finished carcass. Cords 21 are annularly wound along each toe in order to fill the space between the cords of the two layers 14 and 18 at the toe of the bead flanges and binding and chafing strips 22 and 23 are then applied to inclose respective toes in the manner shown in Fig. 8. In this manner each of the bead toes is made a solid unit within which the beads 15 are locked, by reversely lapping core strips while the cords of the two layers are so intermeshed at the beads that displacement with respect thereto is impossible.

Fig. 9 is illustrative of the final step in my method of constructing a cord carcass showing the outer layer of rubber which is placed upon the second cord layer 18 to build out the side walls 24 of the tire and to separate the cords of the outer layer from the tread.

In accordance with the method outlined in the foregoing, I am able to produce a cord carcass formed of a plurality of cord layers, each of which layers is produced by a helical winding of the cord about the core and at its desired bias angle thereto, while the beads of the tire are deeply embedded in the tire flanges formed by a lapping of the edges of the cord layers thereabout. The beads are reliably maintained within these flanges due to the facts that opposite cord edges are reversely lapped and that cords of each lapped edge make an angle with their bias angle of application to the core so that they are all the more firmly locked against any disengagement of the bead.

I have herein specified that the strip of uncured gum which extends across the lower face of the layer of cords comprised by the ends of the cords of the layer 13 is a continuation of the gum strip 19. This arrangement is desirable under some circumstances but it is obvious that as an alternative the gum strip or blanket 12 may be continued to extend to the ends of the cords in the layer 13.

When the gum separating the lapped ends of the two layers of cords 13 and 18 is applied as an element separate from the gum sheet 12 and the gum strip 19, it is possible to employ a novel method in uniting the lapped cord ends to each other and to the bead. By such novel method the gum strip 17 and the gum strip 19 are made from a rubber compound which is adapted to cure to a predetermined degree of hardness in less time than the rubber sheets 12 and 14 require to properly cure. Thus, it is obvious that when the tire has been properly cured in the vulcanizing mold the rubber of strips 17 and 19 will be semi-hard and will therefore give the base greater solidity and rigidity and will consequently produce a union between lapped ends of the cords and between the cords and the beads, which will be more efficient for some purposes than were the gum strips 17 and 19 of the same character of compound as the gum strips 12 and 14.

While in the foregoing I have thus illustrated in the drawings and described in the specification my preferred method of laying up a cord carcass for pneumatic tires in such a manner as to accomplish the objects of the invention as stated in the preceding, I desire to emphasize the fact that such alterations in my method, such as are instanced by changes in the number of the cord layers employed and the cross-sectional character of bead to be used, may be resorted to in such later adaptations of my invention as are to be interpreted as within the scope of the appended claims.

What I claim is:

1. The herein described method of building up a cord carcass for a tire shoe or casing comprised in the following successive steps: (a) the winding of a continuous cord helically about a ring core to completely inclose the latter; (b) the application of endless beads to the cord cover thus produced; (c) the annular slitting of the cord cover along its belly; (d) the bending of the slit edges to overlap the bases of the applied beads; (e) the wrapping of a second continuous cord around both the first ply of cords and the beads engaged thereby; (f) the slitting of the second cord cover along its belly and disposing the slit edges to overlap the beads in the direction opposite to that of the slit edges of the first named cord cover.

2. The herein described method of building up a cord carcass for a tire shoe or casing comprised in the following steps; (a) the helical winding of a continuous cord to completely inclose a ring core; (b) the application of beads to the cord cover, thus produced, adjacent the belly of the cover; (c) the slitting of the cord cover along its belly; (d) the turning of the separated edges of the cord cover to overlap said beads; and (e) the helical winding of a second continuous cord upon the first ply of cords; (f) the slitting of the second cord cover along its belly and bending the separated edges to overlap the beads in the opposite direction to that of the turned edges of the first named cord cover.

3. The herein described method of building up a cord carcass for a tire shoe or casing comprised in the following steps: (a) the helical wrapping of a continuous cord about a ring core to produce a cord cover completely inclosing the core; (b) the application of endless beads to the cord cover adjacent the belly thereof; (c) the slitting of the cord cover along its belly; (d) the turning of the separated edges of the cord cover outward to overlap the bases of respective beads; (e) the helical wrapping of a continuous cord to provide a second cord cover superposed upon the first mentioned cord cover; and (f) the slitting of the second cord cover along its belly and bending of the separated edges to overlap respective beads in a reversed direction to the overlapping of the first mentioned cord cover.

4. The herein described method of building up a cord carcass for a tire shoe or casing comprised in the following steps: (a) the wrapping of a continuous cord at a predetermined bias angle completely around a ring core; (b) the application of endless beads to opposite sides of the cord cover thus laid up upon the core; (c) the slitting of the cord cover along its belly; (d) the turning of the separated edges of the cord cover outwardly and at a predetermined angle to the bias angle of winding of said cover, so that the turned edges of the cord cover overlap the bases of respective beads; and (e) the laying up of a continuous cord to form a superposed cord cover and at a bias angle to the core opposite to the bias angle of the first mentioned cord cover, (f) the slitting of the superposed cord cover along its belly and the bending of the separated edges to overlap the bases of respective beads in a direction opposite to the overlapping of the turned edges of the first mentioned cord cover and also at a predetermined angle to the bias winding angle of the superposed cover.

5. The herein described method of building up a cord carcass for a tire shoe or casing comprised in the following steps; (a) the helical winding of a continuous cord about a ring core to produce a cord cover entirely inclosing the core, the passes or convolutions of the cord making a similar bias angle to the cord surface; (b) the application of endless beads upon opposite sides of the cord layer in proximity to the belly thereof; (c) the slitting of the produced cord cover along its belly and the bending outward of the opposite edges of the cord layer to overlap respective beads in such manner that the bent edges extend at an angle to the helical winding angle of the cords; (d) the winding of a second cord layer upon the core at a bias angle opposite to the bias angle of application of the cords of the first layer; (e) the slitting of the second cord layer along its belly and the bending of the separated edges thus produced to overlap respective beads in a reversed direction to the overlapping edges of the first mentioned cord layer; and (f) the building out of the toe flanges of the carcass by the insertion of annular members therein.

6. The herein described method of building up a cord carcass for a tire shoe or casing comprised in the following steps: (a) the helical winding of a continuous cord about a ring core to produce a cord cover entirely inclosing the core, the passes or convolutions of the cord making a similar bias angle to the core surface; (b) the application of endless beads upon opposite sides of the cord layer in proximity thereof; (c) the slitting of the produced cord cover along its belly and the bending outward of the opposite edges of the cord layer to overlap respective beads by extending at an angle to the helical winding angle of the cords; (d) the winding of a second cord layer upon the core at a bias angle opposite to the bias angle of application of the cords of the first layer; (e) the slitting of the second cord layer along its belly and the bending of the separated edges thus produced to overlap respective beads in a reversed direction to the overlapping edges of the first mentioned cord layer; (f) the building out of the toe flanges of the carcass by the insertion of annular members; and (g) the application of binding and chafing strips to respective toe flanges to maintain each of the turned edges of the superposed cord layers in their clamping juxtaposition to the bead.

7. The herein described method of building up a cord carcass for a tire shoe or casing comprised in the following steps: (a) the helical winding of a continuous cord about a ring core to produce a cord cover entirely inclosing the core, passes or convolutions of the cord making a similar bias angle to the cord surface; (b) the application of endless beads upon opposite sides of the cord layer in proximity to the belly thereof; (c) the slitting of the produced cord cover along its belly and the bending outward of the opposite edges of the cord layer to overlap respective beads by extending at an angle to the helical winding angle of the cords; (d) the winding of a second cord layer upon the core at a bias angle opposite to the bias angle of application of the cords of the first layer; (e) the slitting of the second cord layer along its belly and the bending of the separated edges thus produced to overlap respective beads in a reversed direction to the overlapping edges of the first mentioned cord layer; (f) the building out of the toe flanges of the carcass by the insertion of annular members; (g) the application of binding and chafing strips to respective toe flanges to maintain each of the turned edges of the superposed cord layer in their clamping juxtaposition to the bead; and (h) the building out of the side walls of the cord carcass to complete the carcass in readiness for the application of a tread band thereto.

8. The herein described method of making a tire shoe or casing which consists of the following steps: (a) the wrapping of a continuous cord helically about a core to entirely inclose the latter; (b) the application of endless beads to the cord cover thus produced; (c) the slitting of the cord cover along its belly; (d) the placing of an uncured gum envelop upon the cord cover; (e) the placing of uncured gum strips on the exposed bead faces, such gum strips being of a compound curing semi-hard in less time than that required for a similar curing of the gum envelop; (*f*) the fitting of the cut edges of said cord cover to said beads; (*g*) the winding of a second layer of cord upon said gum envelop; (*h*) the slitting of the second cord cover along its belly and the application of the cut edges to said beads; (*i*) the building out of the side walls of the tire; and (*k*) the vulcanization of the built up carcass, whereby said gum strips are cured to a relatively greater degree of hardness than is said gum envelop.

In testimony whereof I have signed my name in the presence of two subscribing witnesses.

EDWARD NALL.

Witnesses:
LELA WAGNER,
B. J. McDANEL.

Copies of this patent may be obtained for five cents each, by addressing the "Commissioner of Patents, Washington, D. C."